(12) United States Patent
Salamah et al.

(10) Patent No.: US 8,901,790 B2
(45) Date of Patent: Dec. 2, 2014

(54) COOLING OF STATOR CORE FLANGE

(75) Inventors: Samir Armando Salamah, Niskayuna, NY (US); James Jonathan Grant, Niskayuna, NY (US); Christopher Anthony Kaminski, Niskayuna, NY (US); Rebinth Jose Robin, Bangalore (IN); Anil Kumar Tolpadi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 278 days.

(21) Appl. No.: 13/342,840

(22) Filed: Jan. 3, 2012

(65) Prior Publication Data

US 2013/0169080 A1 Jul. 4, 2013

(51) Int. Cl.
*H02K 9/19* (2006.01)

(52) U.S. Cl.
USPC .............................. 310/54; 310/59

(58) Field of Classification Search
CPC ........................................................ H02K 9/19
USPC ........................................ 310/52, 54, 58, 59
IPC ............................................... H02K 9/19, 9/22
See application file for complete search history.

(56) References Cited

U.S. PATENT DOCUMENTS

| | | | |
|---|---|---|---|
| 3,801,843 A | 4/1974 | Corman et al. | |
| 3,989,966 A | 11/1976 | Blank | |
| 4,118,646 A | 10/1978 | Fleming et al. | |
| 4,152,615 A * | 5/1979 | Calfo et al. | 310/256 |
| 4,295,067 A | 10/1981 | Binder et al. | |
| 4,352,034 A * | 9/1982 | Karhan et al. | 310/59 |
| 4,638,199 A * | 1/1987 | Brem et al. | 310/91 |
| 4,685,867 A | 8/1987 | Patun et al. | |
| 5,119,886 A | 6/1992 | Fletcher et al. | |
| 5,140,204 A | 8/1992 | Cashmore et al. | |
| 5,240,069 A | 8/1993 | Yerkes | |
| 5,731,643 A | 3/1998 | Avakian et al. | |
| 5,808,387 A | 9/1998 | Akachi et al. | |
| 5,886,433 A | 3/1999 | Oda et al. | |
| 6,261,437 B1 | 7/2001 | Hernnaes et al. | |
| 6,279,850 B1 | 8/2001 | Berggren | |
| 6,312,298 B1 | 11/2001 | Schuring | |
| 6,357,688 B1 | 3/2002 | Backlund et al. | |

(Continued)

FOREIGN PATENT DOCUMENTS

| | | | | |
|---|---|---|---|---|
| JP | 08298751 A | | 11/1996 | |
| JP | 08298752 A | * | 11/1996 | ............... H02K 9/22 |
| WO | 2008143000 A1 | | 11/2008 | |

OTHER PUBLICATIONS

Machine Translation, Yamamoto et al., JP 08298752 A, Nov. 12, 1996.*

(Continued)

*Primary Examiner* — Quyen Leung
*Assistant Examiner* — Thomas Truong
(74) *Attorney, Agent, or Firm* — Ernest G. Cusick; Hoffman Warnick LLC

(57) ABSTRACT

An approach for cooling a stator core flange is provided. In one aspect, a pair of stator flanges each disposed at opposing ends of a stator core assembly maintains a compressive load on the stator core assembly. Heat transport tubes may be located about at least one of the stator flanges at an end of the stator core assembly to redistribute heat therefrom.

19 Claims, 11 Drawing Sheets

(56) References Cited

U.S. PATENT DOCUMENTS

| | | | |
|---|---|---|---|
| 6,369,470 B1 | 4/2002 | Kylander et al. |
| 6,376,775 B1 | 4/2002 | Leijon et al. |
| 6,396,187 B1 | 5/2002 | Rothman |
| 6,417,456 B1 | 7/2002 | Leijon et al. |
| 6,429,563 B1 | 8/2002 | Rothman et al. |
| 6,439,497 B1 | 8/2002 | Backlund et al. |
| 6,465,979 B1 | 10/2002 | Leijon et al. |
| 6,499,532 B1 | 12/2002 | Williams |
| 6,525,265 B1 | 2/2003 | Leijon et al. |
| 6,525,504 B1 | 2/2003 | Nygren et al. |
| 6,528,907 B2 | 3/2003 | Hwang et al. |
| 6,528,909 B1 | 3/2003 | Kan et al. |
| 6,577,487 B2 | 6/2003 | Gertmar |
| 6,646,363 B2 | 11/2003 | Kylander et al. |
| 6,801,421 B1 | 10/2004 | Sasse et al. |
| 6,822,350 B2 | 11/2004 | Hoppe |
| 6,822,363 B2 | 11/2004 | Leijon |
| 6,825,585 B1 | 11/2004 | Kalldin et al. |
| 6,828,701 B1 | 12/2004 | Berggren et al. |
| 6,831,388 B1 | 12/2004 | Leijon et al. |
| 6,867,674 B1 | 3/2005 | Schutte et al. |
| 6,873,080 B1 | 3/2005 | Leijon et al. |
| 6,885,273 B2 | 4/2005 | Min et al. |
| 6,891,303 B2 | 5/2005 | Leijon et al. |
| 6,894,416 B1 | 5/2005 | Leijon et al. |
| 6,906,447 B2 | 6/2005 | Leijon et al. |
| 6,919,664 B2 | 7/2005 | Leijon et al. |
| 6,936,947 B1 | 8/2005 | Leijon et al. |
| 6,940,380 B1 | 9/2005 | Leijon |
| 6,943,467 B2 | 9/2005 | Potoradi et al. |
| 6,965,185 B1 * | 11/2005 | Kaminski et al. ......... 310/261.1 |
| 6,970,063 B1 | 11/2005 | Fromm et al. |
| 6,972,505 B1 | 12/2005 | Leijon et al. |
| 6,995,646 B1 | 2/2006 | Fromm et al. |
| 7,019,429 B1 | 3/2006 | Larsson et al. |
| 7,045,704 B2 | 5/2006 | Areskoug |
| 7,046,492 B2 | 5/2006 | Fromm et al. |
| 7,061,133 B1 | 6/2006 | Leijon et al. |
| 7,064,463 B2 | 6/2006 | Matin et al. |
| 7,102,267 B2 | 9/2006 | Gromoll et al. |
| 7,141,908 B2 | 11/2006 | Holmstrom et al. |
| 7,378,766 B2 | 5/2008 | Vasilescu et al. |
| 7,423,356 B2 | 9/2008 | Kalsi et al. |
| 7,443,062 B2 | 10/2008 | Dong et al. |
| 7,462,963 B2 * | 12/2008 | Ishihara et al. ............ 310/58 |
| 7,569,955 B2 | 8/2009 | Hassett et al. |
| 7,589,441 B2 | 9/2009 | Kalsi et al. |
| 7,619,345 B2 | 11/2009 | Kalsi et al. |
| 7,621,722 B2 | 11/2009 | Shin et al. |
| 7,629,716 B2 | 12/2009 | Neal |
| 7,635,932 B2 | 12/2009 | Matin et al. |
| 7,687,945 B2 | 3/2010 | Matin et al. |
| 7,705,495 B2 | 4/2010 | Alfermann et al. |
| 7,732,950 B2 | 6/2010 | Yamaoka et al. |
| 7,777,373 B2 | 8/2010 | Bott et al. |
| 7,906,878 B2 | 3/2011 | Fleming et al. |
| 2009/0160269 A1 * | 6/2009 | Bischof et al. ............ 310/52 |

OTHER PUBLICATIONS

Machine Translation, Yamamoto et al., JP 08298751 A, Nov. 12, 1996.*

Search Report from corresponding GB Application No. GB1222868.0 dated Apr. 26, 2013.

* cited by examiner

COOLING OF STATOR CORE FLANGE

BACKGROUND OF THE INVENTION

The present invention relates generally to dynamoelectric machines such as electric generators, and more particularly to redistributing heat from an end of a stator core assembly of an electric generator.

A typical stator core assembly of an electric generator generally includes a stack of thin, insulated, low-loss, electrical steel laminations disposed between inside space block assemblies and outside space block assemblies. Stator flanges along with key bars, which are part of the stator frame that enclose the stator core assembly, maintain a compressive load on the laminations and the space block assemblies that can withstand electromagnetic forces that are present during operation of the electric generator.

The stator core assembly along with other components form a stator. The stator, which is wrapped in armature winding, encloses a rotor wrapped with field winding. In the operation of the electric generator, a turbine such as a steam turbine or gas turbine, drives the rotor to rotate within the stator. An electromagnetic field is induced by rotating the rotor within the stator. The electromagnetic field induced by rotating the rotor induces eddy currents in the stator. The eddy currents are magnetically and electrically resistive and cause the dissipation of energy in the stator in the form of heat (i.e., hot spots). As a result, the eddy currents impose a thermal constraint on the operation of the generator. One particular area in the stator where hot spots arise is at the ends of the core stator assembly along the inner diameter of the stator flanges. Attempts to reduce hot spots at the stator flanges have included providing increased ventilation to the flanges and using flux shields disposed over the flanges to protect against the development of fluxes which induce the eddy currents. Neither approach provides an adequate solution to reducing hot spots at the stator flanges. In particular, increasing ventilation to the flanges is inadequate at reducing hot spot temperatures because this ends up increasing windage losses in the stator, and adding flux shields necessitates substantial design efforts that translate to significant costs.

BRIEF DESCRIPTION OF THE INVENTION

In one aspect of the present invention, a dynamoelectric machine is provided. The dynamoelectric machine comprises: a stator core assembly; a pair of stator flanges, each stator flange from the pair being disposed at opposing ends of the stator core assembly, the pair of stator flanges maintaining a compressive load on the stator core assembly; and a plurality of heat transport tubes located about at least one of the stator flanges at an end of the stator core assembly to redistribute heat therefrom.

DETAILED DESCRIPTION OF THE INVENTION

Various embodiments of the present invention include using heat transport tubes to cool a stator flange used to maintain a compressive load on a stator core assembly. As used herein, a heat transport tube is a device for carrying heat between two locations, generally by means of evaporation and condensation, but also by means of mass transport of a fluid through a flow channel. In one embodiment, the heat transport tubes may include heat pipes, thermosyphons or combinations of the heat pipes with thermosyphons. In one embodiment, the heat transport tubes may be embedded in a stator flange, in the outside space block assembly in the stator core assembly, a heat transport tube holding plate disposed between a stator flange and the outside space block assembly, or in various combinations of a flange, outside space block assembly, flux shunt, and heat transport tube holding plate. In one embodiment, the heat transport tubes may be embedded in a stator flange, the outside space block assembly, the heat transport tube holding plate, or the combinations thereof, with a non-uniform spacing or with a uniform spacing. In addition, in one embodiment, the heat transport tubes may be embedded in a stator flange, the outside space block assembly, the heat transport tube holding plate, or the combinations thereof, with a common angle of tilt or a variable angle of tilt. In another embodiment, a cooling jacket may be located about a stator flange and configured to couple with heat transport tubes disposed in the stator flange, outside space block assembly and the heat transport tube holding plate.

Technical effects of the various embodiments of the present invention include providing an effective solution at redistributing heat from the stator core end near the stator flange, and thus reduce the occurrence of hot spots. Reduction of hot spot temperatures at the stator core end near the stator flange has the commercial impact of increasing reactive capability operating space available to power plant operators, which enables operation of a generator at higher leading power factors.

Figure 1:
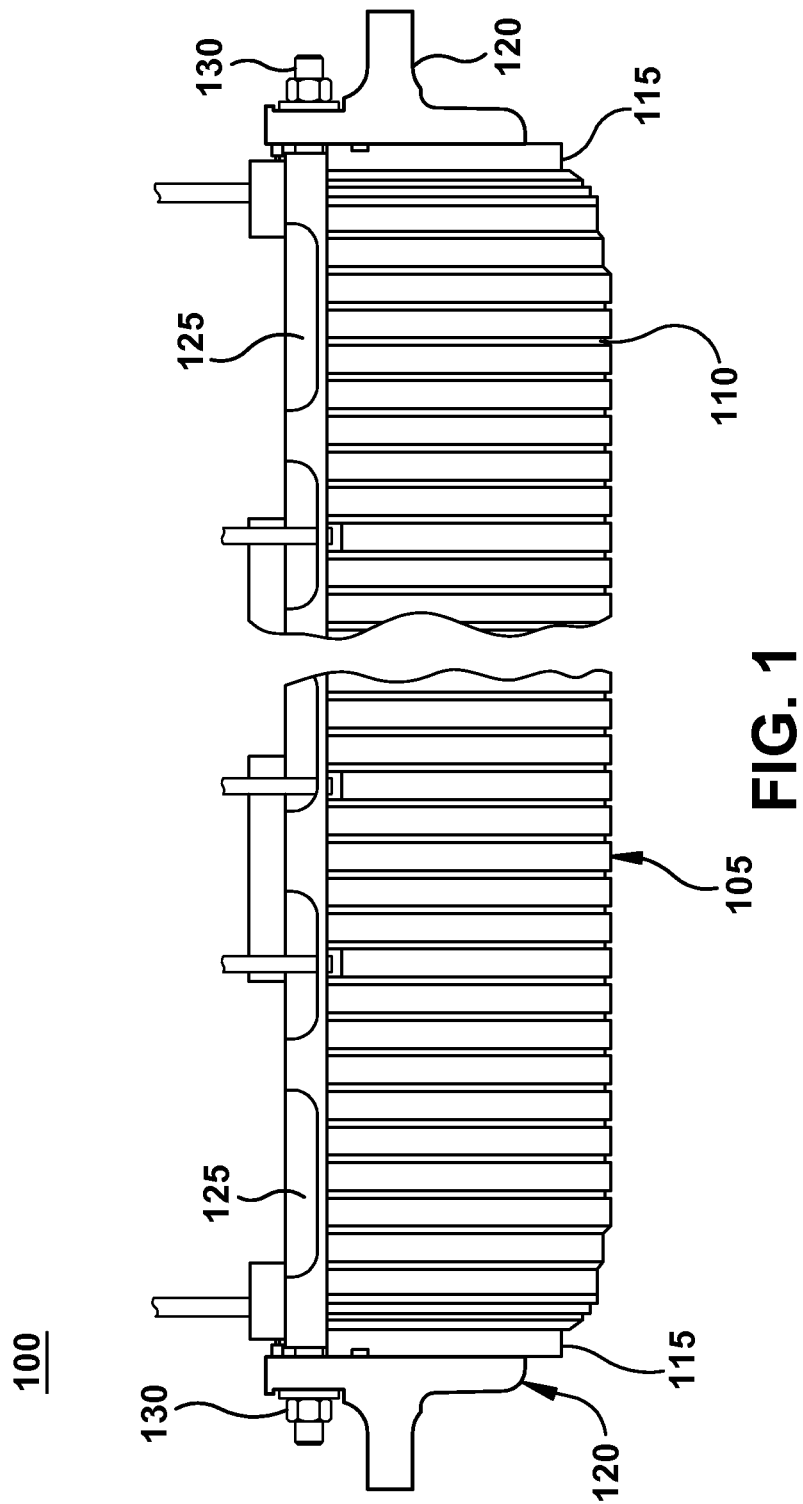
FIG. 1 is a cross-sectional schematic view of a stator core assembly used in a dynamoelectric machine such as an electric generator.

With reference to the drawings, FIG. 1 is a cross-sectional schematic view of a stator core assembly 100 used in a dynamoelectric machine such as an electric generator. Stator core assembly 100 comprises an axially stacked array of flat metal laminations 105 disposed between an inside space block assembly 110 and an outside space block assembly 115. In one embodiment, the axially stacked array of flat metal laminations 105 may be die-stamped (or punched) from sheets of electrical steel, such as for example, grain oriented and non-grain oriented steels. Typically, the laminations are made as thin as practical to decrease electrical eddy current losses, and are electrically insulated from one another. In addition, the laminations are arranged in a flat-side to flat-side relationship, as well as a registered edge-to-edge relationship to form an annular structure. Although not illustrated in FIG. 1, layers are staggered so that slot dovetails of the laminations are registered, while seams between laminations are not registered with those of adjacent layers. The slot dovetails accommodate electrical conductors that form the stator winding and are restrained by wedges installed in the dovetails.

In one embodiment, inside space block assembly 110 and outside space block assembly 115 are fixedly coupled to axially stacked array of flat metal laminations 105, such as example by welding to one or more key bars 125 which are associated with a stator frame containing stator core assembly 100. Inside space block assembly 110 and outside space block assembly 115 typically comprise metal having the form of a rectangular solid. A pair of stator core flanges 120 is disposed at opposing ends of stator core assembly 100. Key bar 125 is retained in stator core flanges 120 by a key bar nut 130. Although not illustrated in FIG. 1, key bar 125 couples to the axially stacked array of flat metal laminations 105, inside space block assembly 110 and outside space block assembly 115 via key bar dovetails. In addition, although not illustrated in FIG. 1, those skilled in the art will recognize that there would be more than one key bar 125 and key bar nut 130 attached to stator core flanges 120 to couple with flat metal laminations 105, inside space block assembly 110 and outside space block assembly 115. In operation, stator core flanges 120 and key bars 125 are used to maintain a compressive load on core assembly 100 including the axially stacked array of flat metal laminations 105, inside space block assembly 110 and outside space block assembly 115.

For sake of simplicity in explaining the various embodiments of the present invention, only certain components of stator core assembly 100 are described herein. Those skilled in the art will recognize that stator core assembly 100 can have more componentry than what is illustrated in FIG. 1 and described herein for use with a dynamoelectric machine such as an electric generator.

Figure 2:
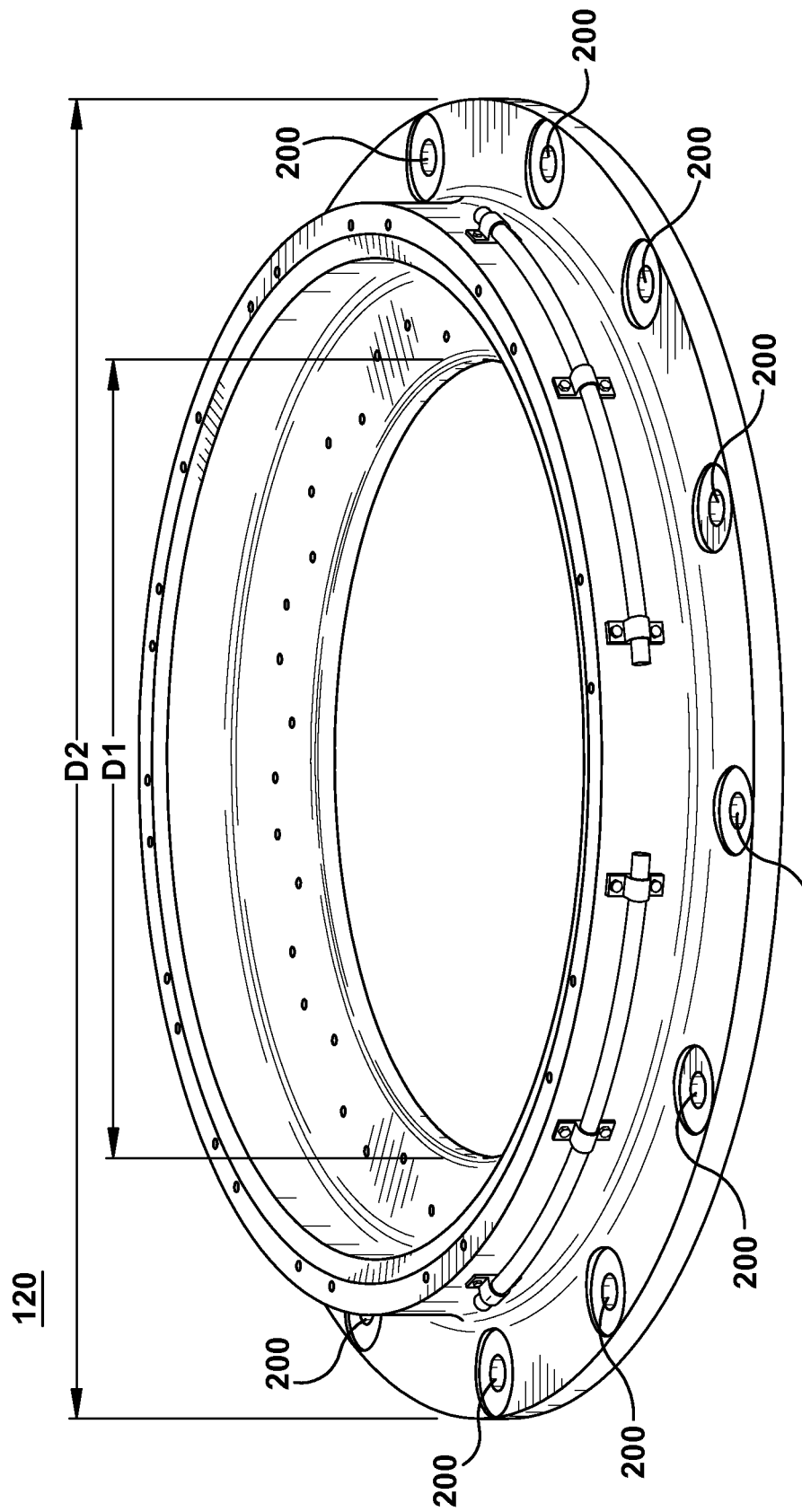
FIG. 2 is a perspective view showing a more detailed illustration of a stator flange used with the stator core assembly depicted in FIG. 1.

FIG. 2 is a perspective view showing a more detailed illustration of a typical stator flange 120 used with stator core assembly 100 depicted in FIG. 1. Stator flange 120 is characterized by an inner diameter D1 and an outer diameter D2. As shown in FIG. 2, stator flange 120 includes a plurality of holes 200 located around its periphery about outer diameter D2. Holes 200 accommodate key bars 125 (FIG. 1) and key bar nuts 130 (FIG. 1). In one embodiment, stator flange 120 may be made from ductile cast iron castings or aluminum. The flange may have a T-cross-section as shown in the figures, but the applicability of the various embodiments of the present invention is not limited to a particular cross-section.

Stator flange 120 as used in stator core assembly 100 (FIG. 1) in the operation of a dynamoelectric machine such as an electric generator is prone to developing hot spot temperatures that impose a thermal constraint on the operation of the generator that eventually affects power output. One particular area in stator flange 120 where hot spots arise is along the inner diameter D1 of the flange that clamps against the ends of the stator core assembly 100 (FIG. 1). Outer diameter D2 of stator flange 120 is essentially devoid of performance impairing hot spots. The various embodiments of the present invention are able to redistribute heat away from the inner diameter D1 of stator flange 120 by using a network of heat transport tubes such as heat pipes and thermosyphons.

Heat transport tubes such as heat pipes and thermosyphons are well-known, proven technology that have effective thermal conductivities two orders of magnitude greater than metal conductors. Heat transport tubes such as heat pipes and thermosyphons transport heat by the two-phase flow of a working fluid (e.g., a refrigerant). Typically, before placed in operation, the heat pipes and thermosyphons are tuned to a desired operating temperature. This is accomplished by selecting an appropriate working fluid and vapor pressure internal to the heat pipes and thermosyphons. Once the heat pipes and thermosyphons have been tuned, they can be used to transport heat.

Generally, heat pipes are vacuum tight devices that include the working fluid and a wick structure. In a typical operation of a heat pipe, heat input vaporizes the working fluid inside the wick structure in an evaporator section of the pipe. The vapor, carrying the latent heat of vaporization, flows towards a cooler condenser section of the heat pipe. In the condenser section, the vapor condenses and gives up its latent heat. The condensed liquid returns to the evaporator section through the wick structure by capillary action against the force of gravity. The phase change processes of the working fluid and two-phase flow circulation continue as long as the temperature gradients between the evaporator section and condenser section are maintained.

Operation of thermosyphons is generally simpler than heat pipes because a wick structure is not used. A wick structure is not used because thermosyphons transport the condensed liquid to the evaporator section with the assistance of gravity. In essence, thermosyphons transfer heat upward or away from an acceleration vector. As a result, the orientation of thermosyphons is more a factor than it is with the heat pipes. In addition, the length of the thermosyphons is typically greater than that of the heat pipes, allowing them to transport heat over a greater distance.

Figure 3:
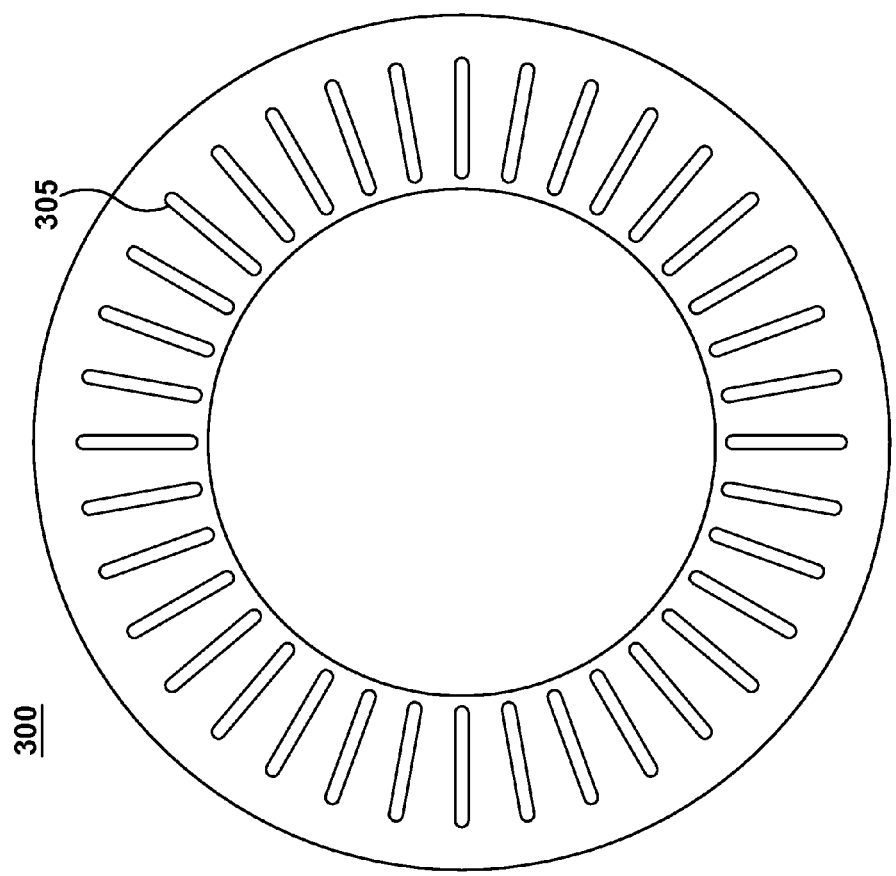
FIG. 3 shows a schematic top view of a stator flange embedded with uniformly spaced heat transport tubes according to one embodiment of the present invention.

FIG. 3 is a schematic cross-sectional view showing a stator flange 300 embedded with heat transport tubes 305 according to one embodiment of the present invention. As shown in FIG. 3, heat transport tubes 305 are oriented in a radial direction and spaced equally along the inside diameter of stator flange 300. In this embodiment, the spacing between adjacent heat transport tubes 305 is optimized to function both with and against the force of gravity.

Figure 4:
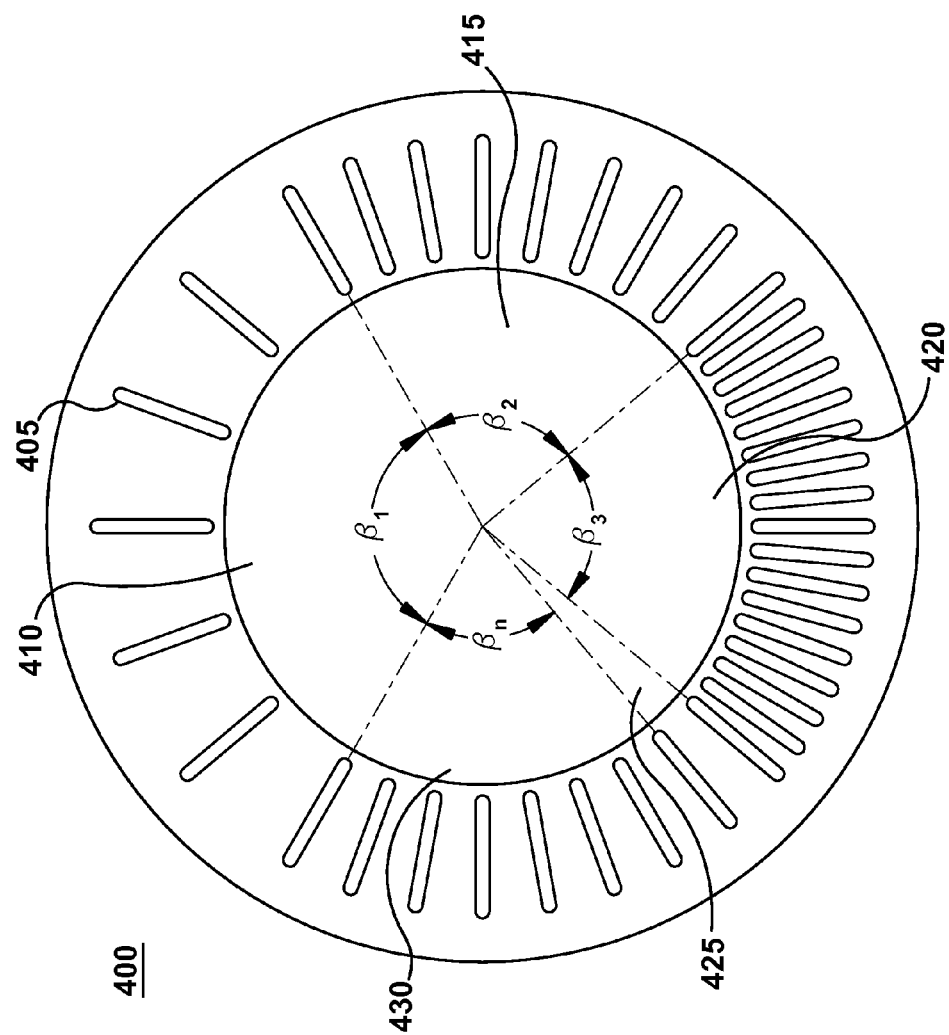
FIG. 4 shows a schematic top view of a stator flange having multiple regions, with each region embedded with uniformly spaced heat transport tubes according to one embodiment of the present invention.

In another embodiment, the heat transport tubes may be arranged in a stator flange to have multiple regions each having fixed spacing between adjacent heat transport tubes. FIG. 4 shows a schematic top view of a stator flange 400 having multiple regions, with each region embedded with uniformly spaced heat transport tubes 405. As shown in FIG. 4, stator flange is divided into n regions (410, 415, 420, 425 and 430). Each region has an angular span $\beta$ (i.e., $\beta_1$, $\beta_2$, $\beta_3$, $\beta_4$, (not illustrated), ... $\beta_n$). In each region (410, 415, 420, 425 and 430), the angular spacing between adjacent heat transport tubes 405 is uniform. Those skilled in the art will appreciate that the pattern of spacing does not need to be symmetric about any specific axis. Note that FIG. 4 reduces to FIG. 3 when all angular spans $\beta_n$ are of the same value.

Figure 5:
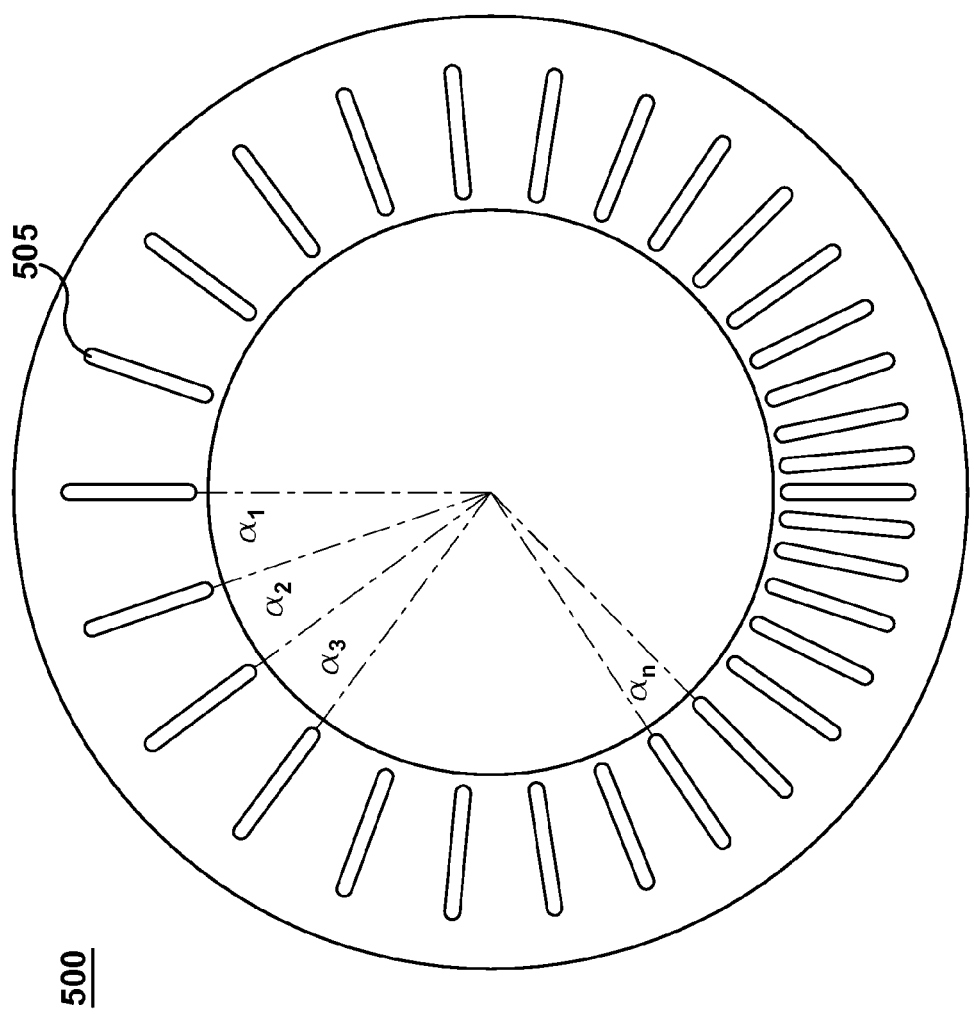
FIG. 5 shows a schematic top view of a stator flange having a uniform spacing gradient of heat transport tube spacing according to one embodiment of the present invention.

In another embodiment, the heat transport tubes may be arranged in a stator flange to have a uniform spacing gradient of heat pipe spacing. FIG. 5 shows a schematic top view of a stator flange 500 having a uniform spacing gradient of the spacing of heat transport tubes 505. As used herein, a uniform spacing gradient of heat pipe spacing varies from one adjacent pair of heat transport tubes to the next by a fixed increment over an angular span. In the embodiment shown in FIG. 5, the stator flange 500 can be described as being divided into two regions, the angular span of each being 180 degrees. Each region starts with a maximum spacing in the vicinity of the 12 o'clock position and decreases to a minimum spacing in the vicinity of the 6 o'clock position. In one embodiment, $\alpha_1$ is equal to $\alpha$, $\alpha_2$ is equal to $\alpha$-$\delta$, $\alpha_3$ is equal to $\alpha$-2$\delta$, and $\alpha_n$ is equal to $\alpha$-n$\delta$, wherein $\alpha$ is angle of minimum spacing between the first adjacent pair of heat transport tubes in the defined region and $\delta$ is incremental angle from one adjacent pair of heat transport tubes to the next. Note that FIG. 5 reduces to FIG. 3 when $\delta$ equals zero.

In another embodiment, the heat transport tubes may be arranged in a stator flange to have a non-uniform spacing gradient of heat pipe spacing. As used herein, a non-uniform spacing gradient of heat transport tube spacing varies from one adjacent pair of heat transport tubes to the next in accordance with the peripheral distribution of the localized heat load and the efficiency of heat transport at the degree of inclination of each heat pipe in the vicinity of the localized heat load. This embodiment can also be represented by the one illustrated in FIG. 5 and thus is not provided herein as a separate figure. In this embodiment, $\alpha_1$ is equal to $\alpha$, $\alpha_2$ is equal to $\alpha$-$\delta_2$, $\alpha_3$ is equal to $\alpha$-$\delta_3$, and $\alpha_n$ is equal to $\alpha$-$\delta_n$, wherein $\alpha$ is angle of minimum spacing between the first adjacent pair of heat transport tubes in the defined region and $\delta_i$ is a variable increment in the angle from one adjacent pair of heat transport tubes to the next in accordance with the peripheral distribution of the localized heat load and the efficiency of heat transport at the degree of inclination of each tube in the vicinity of the localized heat load. In this embodiment, the values for $\delta_i$ can be positive, negative, or zero.

Figure 6:
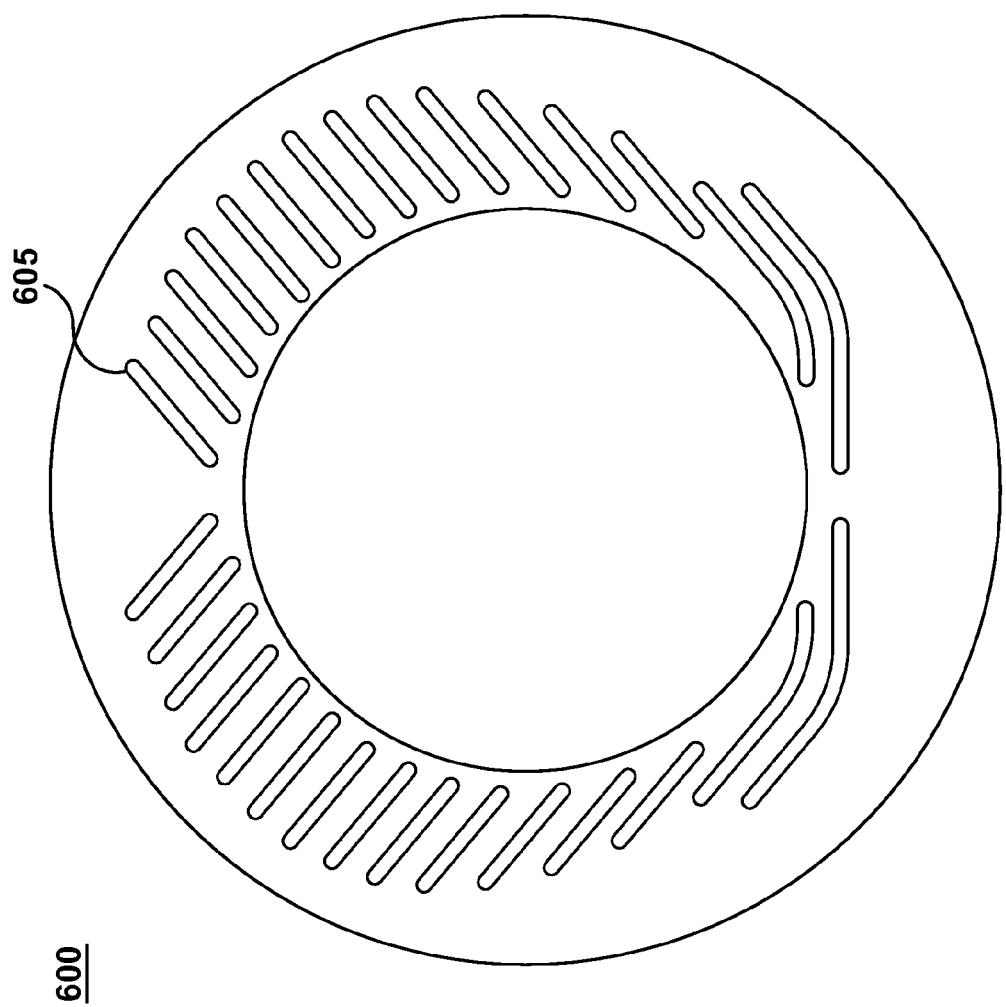
FIG. 6 shows a schematic top view of a stator flange embedded with heat transport tubes that are spaced equally and have the same nominal angle of tilt according to one embodiment of the present invention.

In another embodiment, the heat transport tubes may be arranged to have uniform spacing with the same nominal angle of tilt. FIG. 6 shows a schematic top view of a stator flange 600 embedded with heat transport tubes 605 that are spaced equally and have the same nominal angle of tilt. Note that in this embodiment, heat transport tubes 605 are oriented in a non-radial direction. In addition, even though FIG. 6 pertains to an arrangement of heat transport tubes that may be a combination of heat pipes and thermosyphons, those skilled in the art will recognize that in this embodiment all of the heat transport tubes can be thermosyphons.

Figure 7:
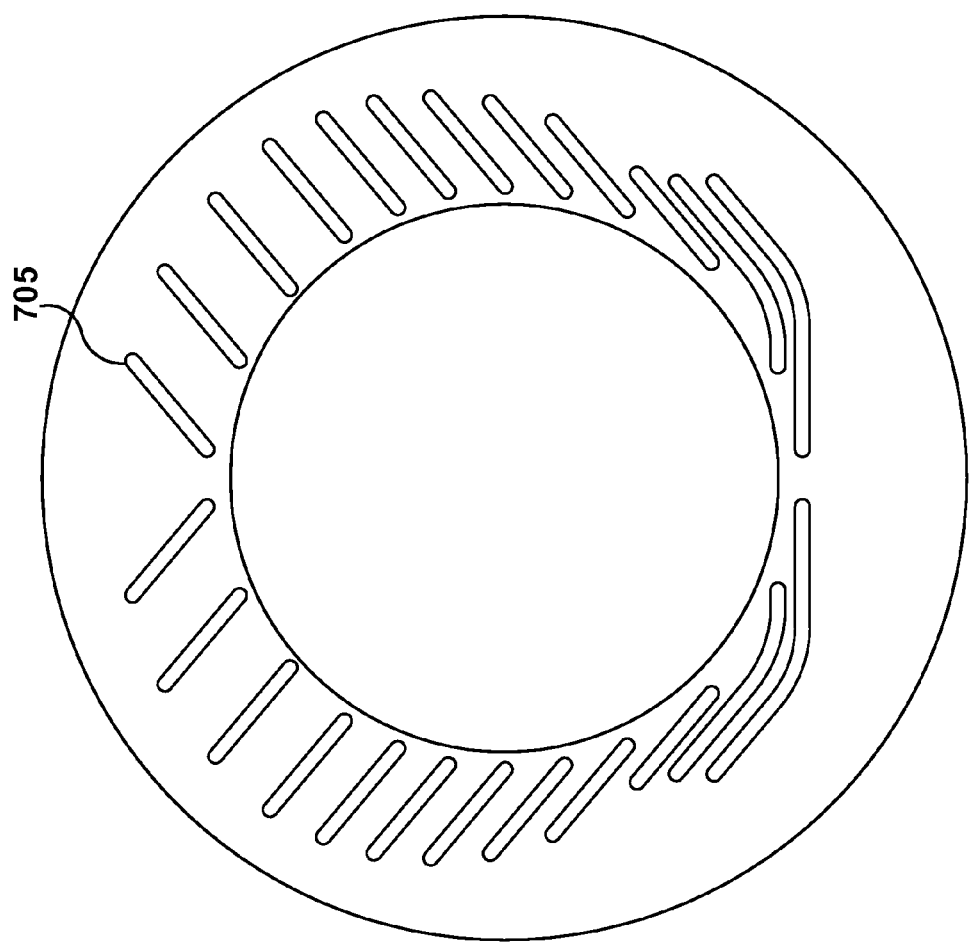
FIG. 7 shows a schematic top view of a stator flange having heat transport tubes that have the same nominal angle of tilt and a range of spacing between adjacent heat transport tubes according to one embodiment of the present invention.

In another embodiment, the heat transport tubes may be arranged in a stator flange to have the same nominal angle of tilt and a range of spacing between adjacent heat transport tubes. FIG. 7 shows a schematic top view of a stator flange 700 having heat transport tubes 705 that have the same nominal angle of tilt and a range of spacing between adjacent heat transport tubes. For example, as shown in FIG. 7, the range of spacing between adjacent heat transport tubes is greater at the top portion of stator flange 700 and progressively less as the bottom of the flange is approached. Note that FIG. 7 reduces to FIG. 6 when the spacing of heat transport tubes 705 is uniform. In addition, even though FIG. 7 pertains to an arrangement of heat transport tubes that can be a combination of heat pipes and thermosyphons, those skilled in the art will recognize that this arrangement is amenable to comprise entirely of heat pipes, or entirely of thermosyphons, which can be oriented in a stator flange to have the same nominal angle of tilt and a range of spacing between adjacent heat transport tubes.

Figure 8:
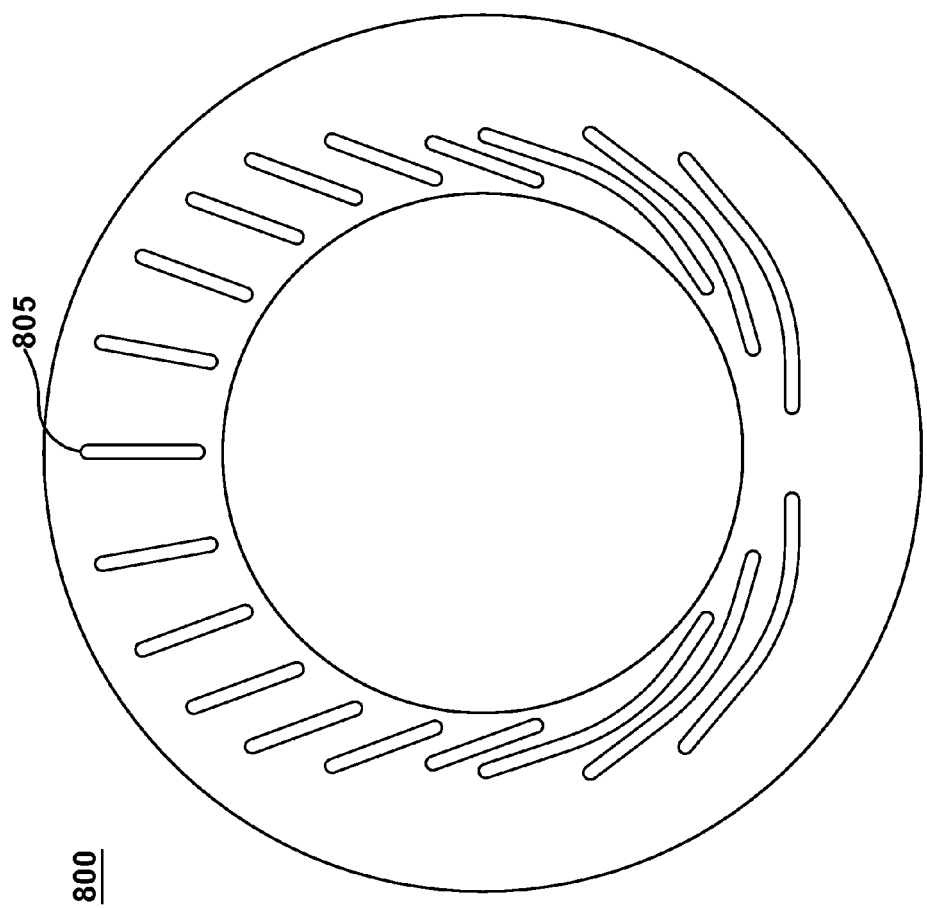
FIG. 8 shows a schematic top view of a stator flange having heat transport tubes that are placed with a range of tilt angles and a range of spacing therebetween according to one embodiment of the present invention.

In yet another embodiment, the heat transport tubes may be arranged in a stator flange to have variable spacing and a variable angle of orientation. FIG. 8 shows a schematic top view of a stator flange 800 having heat transport tubes 805 that are placed with a range of tilt angles and a range of spacing therebetween. For example, as shown in FIG. 8, the range of spacing between adjacent heat transport tubes is greater at the top portion of stator flange 800 and closer together at the bottom of the flange. In addition, the tilt angles of heat transport tubes 805 is greater at the top portion of stator flange 800, while the tilt angles of heat transport tubes at the bottom portion the stator flange is smaller. Note that FIG. 8 reduces to FIG. 7 when the tilt angles of heat transport tubes 805 are all the same. Similarly, FIG. 8 reduces to FIG. 6 when the tilt angles and spacing between adjacent heat transport tubes 805 are the same. In addition, even though FIG. 8 pertains to an arrangement of heat transport tubes that can be a combination of heat pipes and thermosyphons, those skilled in the art will recognize that this arrangement is amenable to comprise entirely of heat pipes, or entirely of thermosyphons, which can be oriented in a stator flange to have a range of tilt angles and a range of spacing therebetween.

In one embodiment, both the aforementioned heat transport tubes (e.g., heat pipes, thermosyphons and combinations thereof) can be embedded in the internal volume of the inner diameter of their respective stator core flanges by inserting them in cavities formed in the flanges. In one embodiment, the cavities are oriented in such manner that one end is proximate to the hottest region of the stator core flange and the other end is proximate to a substantially cooler region of the flange. As a result, the working fluid inside the heat transport tubes evaporates in the hot region of the flange at the evaporation section, and then migrates to the cooler region of the flange where it condenses and returns to the hot region (the condenser section), thus functioning to transport heat away from the hot region of the flange.

Figure 9:
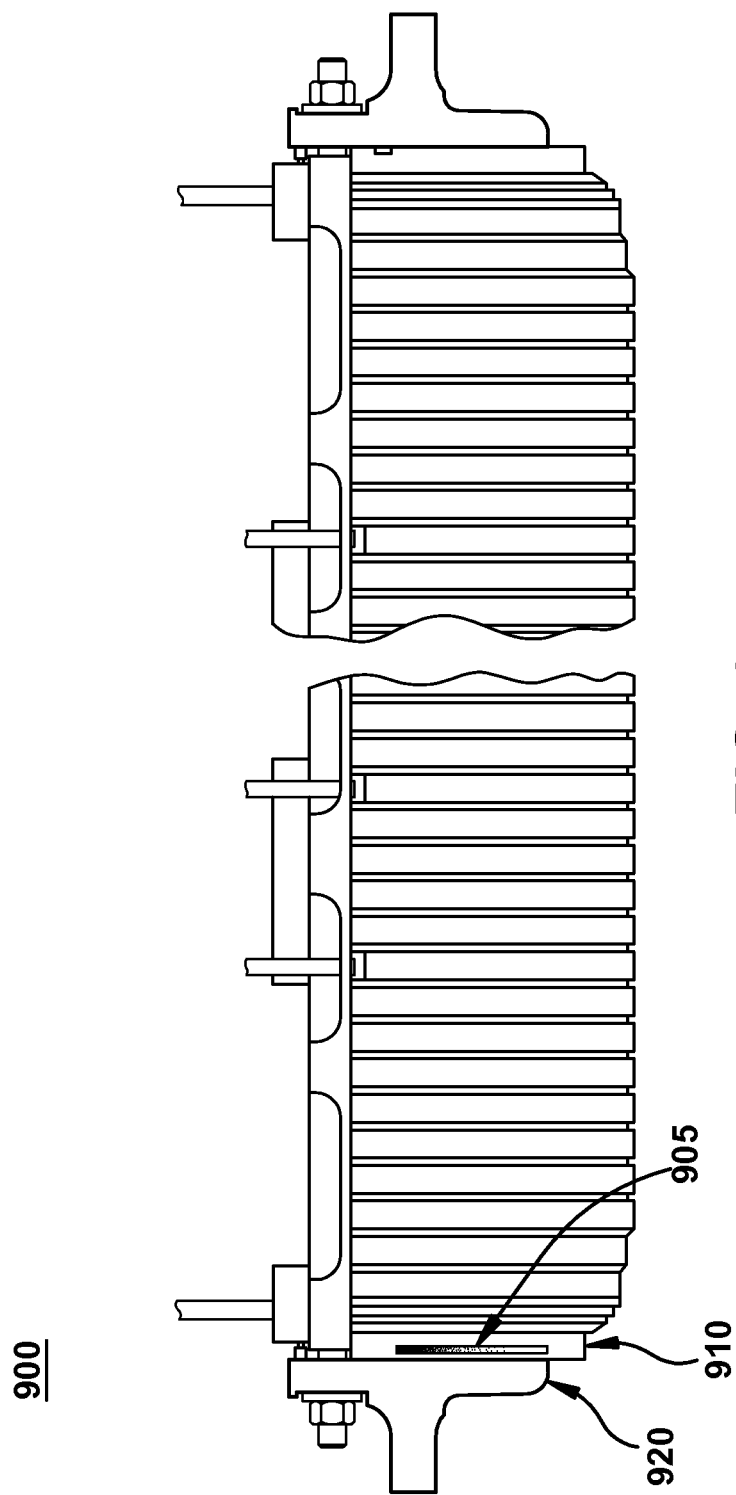
FIG. 9 is a cross-sectional view of a stator core assembly schematically showing heat transport tubes such as heat pipes and thermosyphons embedded in an outside space block assembly of the stator core assembly according to one embodiment of the present invention.

As mentioned above, a stator core assembly would have a pair of stator flanges disposed at opposing ends of stator core assembly 100 (FIG. 1). In one embodiment, both stator flanges could be implemented with heat transport tubes that may include heat pipes, thermosyphons, or with combinations of both. In another embodiment, only one of the stator flanges in the pair could be implemented with heat transport tubes that may include heat pipes, thermosyphons, or combinations of both. This embodiment could have utility in an application with an electric generator that uses heat exchangers on only one end, in which case, only the opposite end would require the additional cooling benefit of locating heat transport tubes in or adjacent to the stator flange FIG. 9 is a cross-sectional view of a stator core assembly 900 schematically showing heat transport tubes 905 such as heat pipes and thermosyphons embedded in an outside space block assembly 910 of the stator core assembly according to one embodiment of the present invention. As shown in FIG. 9, the heat transport tubes that may include heat pipes, thermosyphons or combinations thereof would be embedded in outside space block assembly 910 in order to transport heat away from a stator core flange 920. Note that in one embodiment, the heat transport tubes would be oriented in a generally radial direction in order to transfer heat from diameter D1 of the stator flange towards diameter D2 of the flange (FIG. 2). In this embodiment, the heat transport tubes would operate in the same manner as described above. Note that although further details of stator core assembly 900 have not been discussed, elements such as laminations, inside space block assembly, key bars, key bar nuts as discussed above could be included in this stator core assembly.

Figure 10:
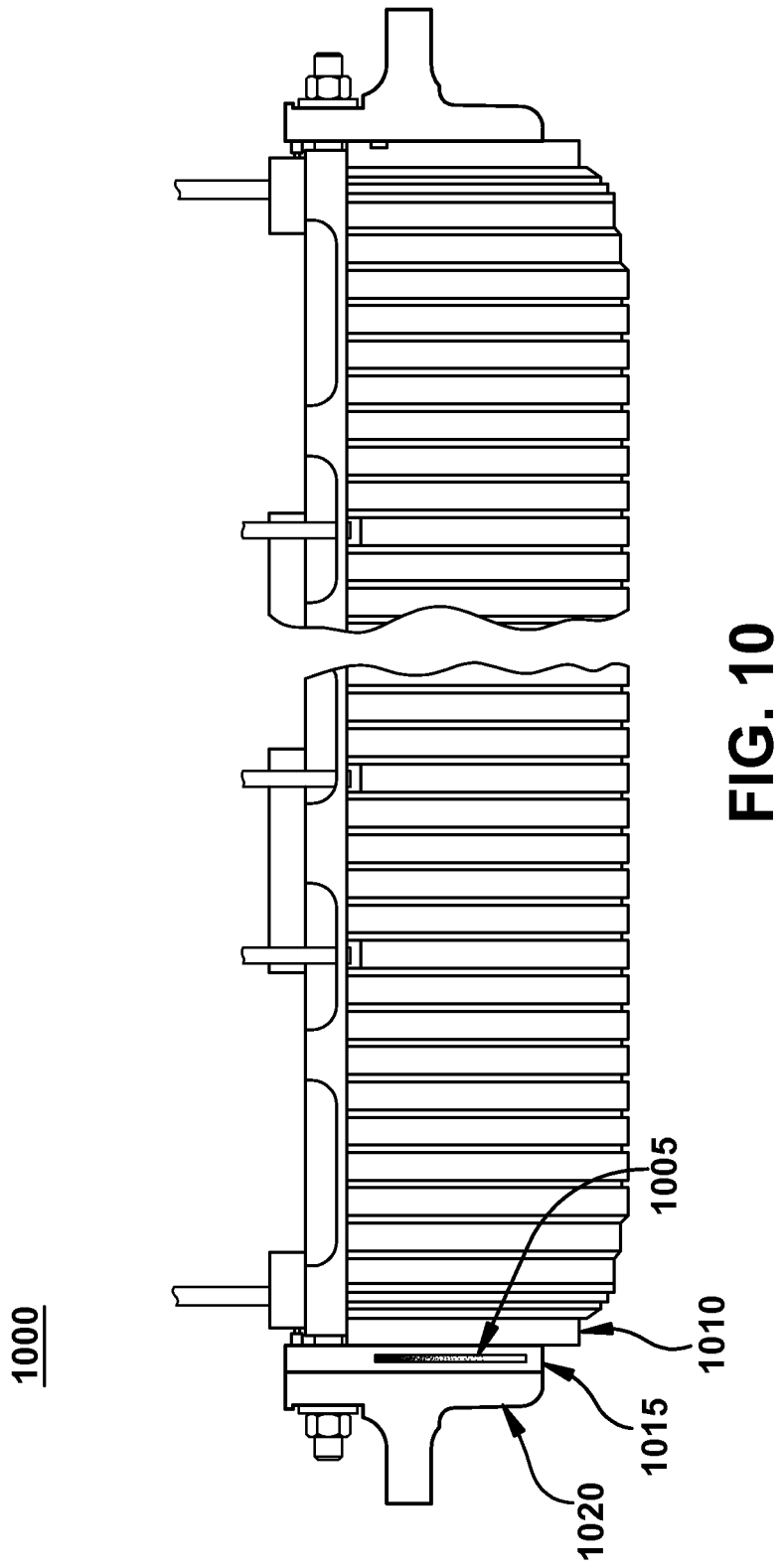
FIG. 10 is a cross-sectional view of a stator core assembly schematically showing a heat transport tube holding plate embedded with heat transport tubes such as heat pipes and thermosyphons according to one embodiment of the present invention.

FIG. 10 is a cross-sectional view of a stator core assembly 1000 schematically showing a heat transport tube holding plate 1015 embedded with heat transport tubes 1005 such as heat pipes and thermosyphons according to one embodiment of the present invention. As shown in FIG. 10, heat transport tube holding plate 1015 is located between stator flange 1020 and outside space block assembly 1010. In one embodiment, heat transport tube holding plate 1015 is disposed against the inside surface of stator flange 1020, as this places the plate closer to the sources of heat and would allow the plate to be clamped between the flange. This would secure heat transport tube holding plate 1015 in place and provide contact pressure for heat transfer to the heat pipes or thermosyphons. In this embodiment illustrated in FIG. 10, the heat transport tubes would operate in the same manner as described above. Note that in one embodiment, the heat transport tubes would be oriented in a generally radial direction in order to transfer heat from diameter D1 of the stator flange towards diameter D2 of the flange (FIG. 2). In addition, note that although further details of stator core assembly 1000 have not been discussed, elements such as laminations, inside space block assembly, key bars, key bar nuts as described above could be included in this stator core assembly.

Heat transport tube holding plate 1015 with accompany heat transport tubes that may include heat pipes and thermosyphons is not limited to being disposed between stator flange 1020 and outside space block 1010. For example, those skilled in the art will recognize that it is possible to place heat transport tube holding plate 1015 and accompanying heat pipes and thermosyphons outboard of stator flange 1020. Essentially, heat transport tube holding plate 1015 and accompanying heat pipes and thermosyphons can be located at any available stator core end interface, including interfaces between the core and outside space block assembly 1010, outside space block assembly 1010 and stator flange 1020, stator flange 1020 and a flux shunt (i.e., additional laminations that can be placed outboard of the outside space block assembly), the flux shunt and the outside space block assembly, and any external surface of the flange. Those skilled in the art will recognize that wherever heat transport tube holding plate 1015 is disposed, the orientation of the heat transport tubes may need to be modified according to the location of where the plate is disposed.

Figure 11:
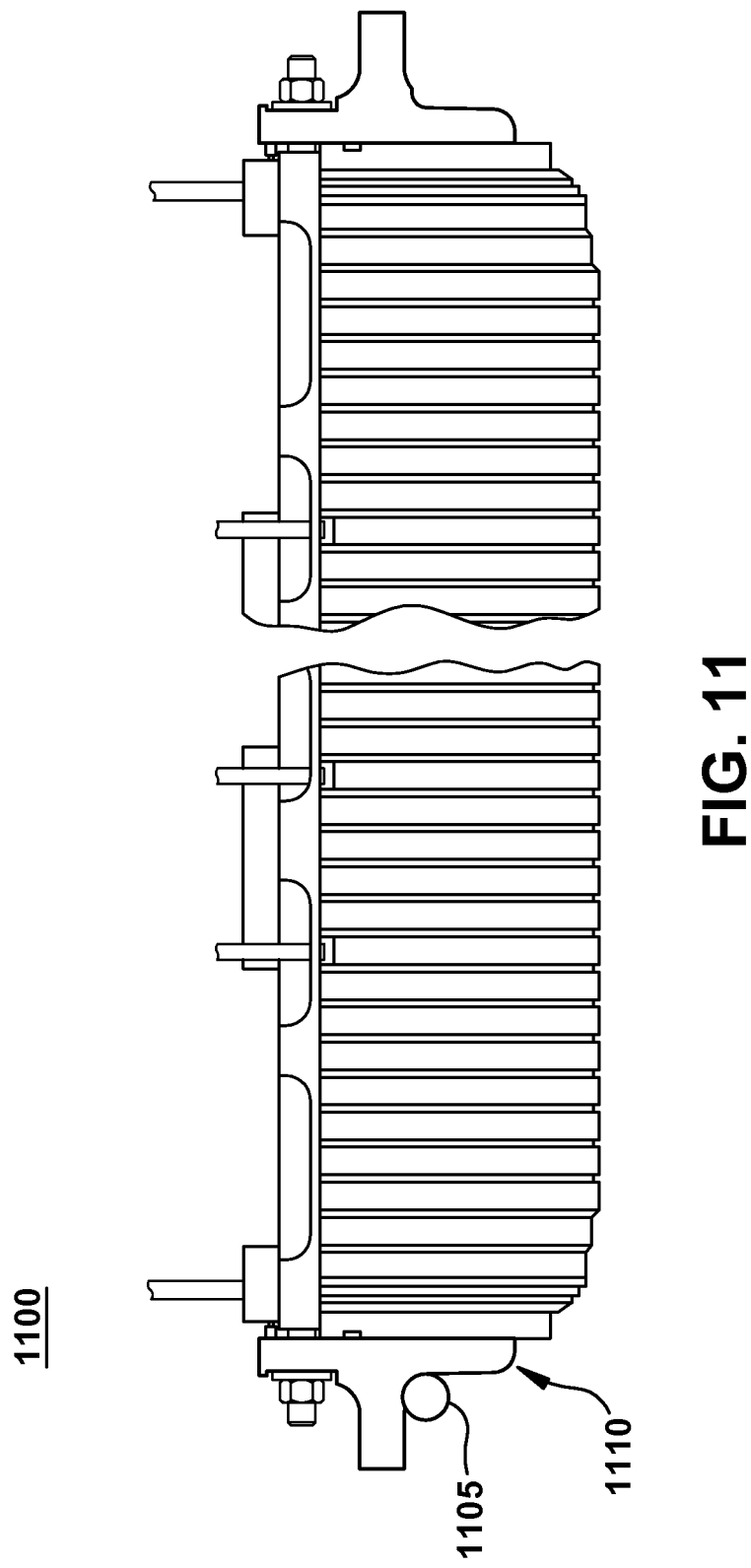
FIG. 11 is a cross-sectional view of a stator core assembly schematically showing a cooling jacket adjacent a stator flange embedded with heat transport tubes such as heat pipes and thermosyphons according to one embodiment of the present invention.

FIG. 11 is a cross-sectional view of a stator core assembly 1100 schematically showing a cooling jacket 1105 adjacent a stator flange 1110 embedded with heat transport tubes (not shown) such as heat pipes and thermosyphons according to one embodiment of the present invention. In one embodiment, cooling jacket 1105 could receive heat by thermal conduction from the vapor transported from the heat transport tubes and condense the vapor. The condensed liquid returns to the evaporator section of the transport tubes to reduce the hot spot temperatures at the inner diameter of stator flange 1110. In one embodiment, cooling jacket 1105 can transport a cooling fluid, such as air, hydrogen or water. As shown in FIG. 11, cooling jacket 1105 is located outboard of stator flange 1110. In this embodiment illustrated in FIG. 11, the heat transport tubes would operate in the same manner as described above. Note that although further details of stator core assembly 1100 have not been discussed, elements such as laminations, outside space block assembly, inside space block assembly, key bars, key bar nuts as described above could be included in this stator core assembly.

Cooling jacket 1105 is not limited to being disposed outboard of stator flange 1115. For example, those skilled in the art will recognize that it is possible to place cooling jacket 1105 at any available stator core end interface, including but not limited to the outer diameter D2 (FIG. 2), the outboard face of a flange extension (for example the mid-section of a flange with a T-section), the radially inner or radially outer surfaces of the flange extension, the outboard surface of a flange (irrespective of whether it has a flange extension or not), or through a cavity internal to the flange. Those skilled in the art will further recognize that the orientation of the heat pipes and thermosyphons may need to be modified depending on where cooling jacket 1105 is disposed.

Although not illustrated, it is possible to have the various embodiments described in FIGS. 3-11 to be arranged to have a the heat transport tubes formed from a combination of heat pipes with thermosyphons, as opposed to only one or the other. Those skilled in the art would recognize that combining heat pipes with thermosyphons would necessitate specialized spacing that could accommodate their respective orientations with regard to gravity. As an example, the lower half of the stator flange could be cooled by heat pipes and the upper half could be cooled by thermosyphons. This is only one example and those skilled in the art will recognize the possibilities of other design configurations.

Furthermore, although not illustrated in the drawings, the various embodiments of the present invention are not limited to having the heat transport tubes such as heat pipes and thermosyphons embedded in only one of the aforementioned locations (i.e., the stator core flange, the outside space block assembly, the heat transport tube holding plate). Those skilled in the art will recognize that the heat transport tubes such as heat pipes and thermosyphons can be embedded in multiple locations about the stator core end to further facilitate reduction of hot spot temperatures at the core end. For example, the heat transport tubes such as heat pipes and thermosyphons could be positioned about the stator core end using various locations such as the stator flange, the outside space block assembly, and the heat transport tube holding plate.

The use of heat transport tubes such as heat pipes and thermosyphons to redistribute heat from the end of the stator core reduces thermal gradients, and in turn, reduces hot spot temperatures that arise at the stator core end in places such as the stator flange. Reducing hot spot temperatures at the stator core end translates into better electric generator output.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A turbine-driven generator, comprising:
a stator core assembly having an axially stacked array of metal laminations;
a pair of stator flanges each having an inner diameter and an outer diameter, each stator flange from the pair being disposed at opposing ends of the stator core assembly, the pair of stator flanges clamping the opposing ends of the stator core assembly to maintain a compressive load on the axially stacked array of laminations; and
a plurality of heat pipes and/or thermosyphons embedded in an internal volume of at least one of the stator flanges in cavities that extend from the inner diameter to the outer diameter to redistribute heat from the inner diameter to the outer diameter, the plurality of heat pipes and/or thermosyphons redistributing heat from the inner diameter to the outer diameter by evaporation, condensation, and mass transport of a fluid through a flow channel, wherein each heat pipe and/or thermosyphon has a two-phase flow of a working fluid present therein that includes a liquid phase and a vapor phase, wherein the liquid phase and the vapor phase present in the heat pipe and/or thermosyphon counter flow relative to each other.

2. The turbine-driven generator according to claim 1, wherein the plurality of heat pipes and/or thermosyphons are arranged in the at least one stator flange with a spacing that is optimized to transport heat both with and against a force of gravity.

3. The turbine-driven generator according to claim 1, wherein the plurality of heat pipes are arranged in the at least one stator flange with a uniform spacing.

4. The turbine-driven generator according to claim 1, wherein the plurality of heat pipes and/or thermosyphons are arranged in the at least one stator flange with a non-uniform spacing.

5. The turbine-driven generator according to claim 4, wherein the plurality of heat pipes and/or thermosyphons concentrated near a bottom of the at least one stator flange are spaced closer together and heat pipes concentrated near a top of the at least one stator flange are spaced further apart, a spacing of the heat pipes increasing progressively from the bottom of the at least one stator flange to the top of the at least one stator flange.

6. The turbine-driven generator according to claim 5, wherein the heat pipes and/or thermosyphons concentrated near the bottom of the at least one stator flange are tilted with less tilt angle and the thermosyphons concentrated near the top of the at least one stator flange are tilted with more of a tilt angle, the degree of tilt of the thermosyphons increasing progressively from the bottom of the at least one stator flange to the top of the at least one stator flange.

7. The turbine-driven generator according to claim 4, wherein the plurality of heat pipes and/or thermosyphons are arranged to have varying degrees of tilt, wherein thermosyphons concentrated near a bottom of the at least one stator flange are spaced closer together and thermosyphons concentrated near a top of the at least one stator flange are spaced further apart, a spacing of the plurality of thermosyphons increasing progressively from the bottom of the at least one stator flange to the top of the at least one stator flange.

8. The turbine-driven generator according to claim 1, wherein the plurality of heat pipes and/or thermosyphons are arranged in multiple regions of the at least one stator flange, the heat pipes being arranged with fixed spacing in each of the regions.

9. The turbine-driven generator according to claim 1, wherein the plurality of heat pipes and/or thermosyphons are arranged in the at least one stator flange with a uniform spacing gradient of heat pipes.

10. The turbine-driven generator according to claim 1, wherein the plurality of heat pipes and/or thermosyphons are arranged in the at least one stator flange with a non-uniform spacing gradient of heat pipes.

11. The turbine-driven generator according to claim 1, wherein the plurality of heat pipes and/or thermosyphons are arranged in the at least one stator flange with a common nominal angle of tilt and an equal spacing therebetween.

12. The turbine-driven generator according to claim 1, wherein the plurality of heat pipes and/or thermosyphons are arranged in the at least one stator flange with a common nominal angle of tilt and a varying range of spacing therebetween.

13. The turbine-driven generator according to claim 1, wherein the plurality of heat pipes and/or thermosyphons are arranged in the at least one stator flange with a varying angle of tilt and a varying range of spacing therebetween.

14. The turbine-driven generator according to claim 1, wherein the stator core assembly includes an outside space block assembly located about one of the stator flanges from the pair of stator flanges.

15. The turbine-driven generator according to claim 14, further comprising a plurality of heat pipes and/or thermosyphons embedded within the outside space block assembly.

16. The turbine-driven generator according to claim 1, further comprising at least one holding plate located about a surface that interfaces with an end of the stator core assembly.

17. The turbine-driven generator according to claim 16, wherein the at least one holding plate is configured to receive a plurality of heat pipes and/or thermosyphons.

18. The turbine-driven generator according to claim 1, further comprising at least one cooling jacket located at a surface that interfaces with an end of the stator core assembly.

19. The turbine-driven generator according to claim 18, wherein the at least one cooling jacket is configured to enhance heat transfer from a plurality of heat pipes and/or thermosyphons.

* * * * *

UNITED STATES PATENT AND TRADEMARK OFFICE
CERTIFICATE OF CORRECTION

PATENT NO.        : 8,901,790 B2                                  Page 1 of 1
APPLICATION NO.   : 13/342840
DATED             : December 2, 2014
INVENTOR(S)       : Salamah et al.

It is certified that error appears in the above-identified patent and that said Letters Patent is hereby corrected as shown below:

In the specification,

In Column 4, Line 67, delete "$\beta_4$," and insert -- $\beta_4$ --, therefor.

In Column 6, Line 56, delete "flange" and insert -- flange. --, therefor.

In Column 8, Line 19, delete "a the" and insert -- the --, therefor.

Signed and Sealed this
Eighth Day of March, 2016

Michelle K. Lee
*Director of the United States Patent and Trademark Office*